United States Patent
Hachisuka et al.

(10) Patent No.: US 6,177,011 B1
(45) Date of Patent: Jan. 23, 2001

(54) COMPOSITE REVERSE OSMOSIS MEMBRANE HAVING A SEPARATION LAYER WITH POLYVINYL ALCOHOL COATING AND METHOD OF REVERSE OSMOTIC TREATMENT OF WATER USING THE SAME

(75) Inventors: Hisao Hachisuka, Kyoto; Kenichi Ikeda, Shiga, both of (JP)

(73) Assignee: Nitto Denko Corporation, Osaka (JP)

( * ) Notice: Under 35 U.S.C. 154(b), the term of this patent shall be extended for 0 days.

(21) Appl. No.: 09/077,768

(22) PCT Filed: Mar. 17, 1997

(86) PCT No.: PCT/JP97/00856
§ 371 Date: Jun. 3, 1998
§ 102(e) Date: Jun. 3, 1998

(87) PCT Pub. No.: WO97/34686
PCT Pub. Date: Sep. 25, 1997

(30) Foreign Application Priority Data

Mar. 18, 1996 (JP) .................................................. 8-061477
Apr. 24, 1996 (JP) .................................................. 8-102657
May 7, 1996 (JP) .................................................. 8-112542

(51) Int. Cl.[7] .......................... B01D 61/02; B01D 69/02; B01D 71/56

(52) U.S. Cl. .............................. 210/500.38; 210/500.34; 210/490; 210/652; 210/653

(58) Field of Search .................... 210/641, 490, 210/638, 500.38, 500.42, 538, 500.29, 650, 651, 652, 635, 504, 500.37, 500.21

(56) References Cited

U.S. PATENT DOCUMENTS

| | | |
|---|---|---|
| 3,133,132 | 5/1964 | Loeb et al. . |
| 3,133,137 | 5/1964 | Loeb et al. . |
| 3,620,895 | 11/1971 | Bailey et al. .......................... 428/163 |

(List continued on next page.)

FOREIGN PATENT DOCUMENTS

| | | |
|---|---|---|
| 787525 | * 8/1997 | (EP) . |
| 51-13388 | 2/1976 | (JP) . |
| 53-16372 | 2/1978 | (JP) . |
| 58-145740 | 8/1983 | (JP) . |
| 61-287492 | 12/1986 | (JP) . |
| 62-121603 | 6/1987 | (JP) . |
| 62-197105 | 8/1987 | (JP) . |
| 63-218208 | 9/1988 | (JP) . |
| 2-090990 | 3/1990 | (JP) . |
| 5-253454 | 10/1993 | (JP) . |
| 6-170186 | 6/1994 | (JP) . |
| 7-090152 | 4/1995 | (JP) . |
| 92/20438 | * 11/1992 | (WO) . |

OTHER PUBLICATIONS

U.S. application Ser. No. 09/055,555, Hisao Hachisuka, et al., filed Apr. 6, 1998.

* cited by examiner

Primary Examiner—W. L. Walker
Assistant Examiner—Marianne S. Ocampo
(74) Attorney, Agent, or Firm—Akin, Gump, Strauss, Hauer & Feld, L.L.P.

(57) ABSTRACT

A reverse osmosis composite membrane that has a high salt rejection, a high water permeability, and a high fouling tolerance, and permits practical desalination at a relatively low pressure is provided by coating the surface of a reverse osmosis membrane of aromatic polyamide with polyvinyl alcohol (PVA), for example, and controlling the surface zeta potential of the separation layer within±10 mV at pH 6. This reverse osmosis composite membrane is electrically neutral and controls the electrical adsorption of membrane-fouling substances having a charge group present in water. Therefore, a high separation property can be maintained without fouling the membrane even if water containing a surfactant or a transition metal component is supplied as raw water.

15 Claims, 3 Drawing Sheets

U.S. PATENT DOCUMENTS

| | | |
|---|---|---|
| 3,878,109 | 4/1975 | Ikeda et al. .................. 210/500.38 |
| 4,277,344 | 7/1981 | Cadotte . |
| 4,366,062 | 12/1982 | Kurihara et al. .................. 210/651 |
| 4,431,545 | 2/1984 | Pall et al. . |
| 4,520,044 | 5/1985 | Sundet . |
| 4,529,646 | 7/1985 | Sundet . |
| 4,702,840 | 10/1987 | Degen et al. . |
| 4,778,596 * | 10/1988 | Linder et al. .................. 210/638 |
| 4,872,984 | 10/1989 | Tomaschke . |
| 4,909,943 * | 3/1990 | Fibiger et al. .................. 210/500.27 |
| 4,911,844 * | 3/1990 | Linder et al. .................. 210/638 |
| 4,948,507 | 8/1990 | Tomaschke . |
| 5,019,261 * | 5/1991 | Stengaard .................. 210/490 |
| 5,128,041 * | 7/1992 | Degen et al. .................. 210/638 |
| 5,156,740 * | 10/1992 | Bruschke .................. 210/490 |
| 5,183,571 * | 2/1993 | Hanel et al. .................. 210/649 |
| 5,259,950 * | 11/1993 | Shiro et al. .................. 210/490 |
| 5,358,745 | 10/1994 | Tran et al. . |
| 5,989,426 * | 11/1999 | Hirose et al. .................. 210/500.38 |

COMPOSITE REVERSE OSMOSIS MEMBRANE HAVING A SEPARATION LAYER WITH POLYVINYL ALCOHOL COATING AND METHOD OF REVERSE OSMOTIC TREATMENT OF WATER USING THE SAME

TECHNICAL FIELD

The present invention relates to improvements in the performance of a reverse osmosis composite membrane such as performance stability and fouling tolerance for selectively separating the components of a liquid mixture. More particularly, the present invention relates to a reverse osmosis composite membrane having a high salt rejection, a high chlorine tolerance, and a high fouling tolerance, which comprises a polymer thin film on the reverse osmosis composite membrane, and to a reverse osmosis treatment method for water using the same.

Such a reverse osmosis composite membrane is suitable for manufacturing ultrapure water, desalinating brackish water, and the like, and it also can contribute to the removal and recovery of the contaminating sources or effective substances from a soil or the like, the cause of pollution in a dyeing waste water system, an electrochemical deposition paint waste water system, or a domestic waste water system to implement a waste water recycling system. In particular, it can operate stably for a long period with respect to the quality of water containing various membrane-fouling substances, such as surfactants and transition metal components including iron, which cause a decrease in flux.

BACKGROUND ART

Examples of the industrially utilized reverse osmosis membranes include Loeb type membranes described in U.S. Pat. Nos. 3,133,132 and 3,133,137 as asymmetric membranes made of cellulose acetate. On the other hand, reverse osmosis composite membranes, in which an active thin film substantially having a selective separation property is formed on a microporous support film, are known as reverse osmosis membranes having a different structure from the asymmetric reverse osmosis membranes.

Presently, a number of such reverse osmosis composite membranes, in which a thin film of polyamide obtained by interfacial polymerization of polyfunctional aromatic amine and polyfunctional aromatic acid halide is formed on a support film are known (for example, Publication of Japanese Patent Application (Tokkai Sho) No. 55-147106, Publication of Japanese Patent Application (Tokkai Sho) No. 62-121603, Publication of Japanese Patent Application (Tokkai Sho) No. 63-218208, and Publication of Japanese Patent Application (Tokkai Hei) No. 2-187135). Also, those having a thin film of polyamide obtained by interfacial polymerization of polyfunctional aromatic amine and polyfunctional alicyclic acid halide formed on a support film are known (for example, Publication of Japanese Patent Application (Tokkai Sho) No. 61-42308).

In addition, various methods for after treatment of the reverse osmosis membrane are disclosed. For example, methods using various polymers as a protective layer are disclosed (for example, Publication of Japanese Patent Application (Tokkai Sho) No. 51-13388, Publication of Japanese Patent Application (Tokkai Sho) No. 53-16372, Publication of Japanese Patent Application (Tokkai Sho) No. 62-197105, and Publication of Japanese Patent Application (Tokko Hei) No. 7-90152).

Recently, it has been expected to apply a reverse osmosis membrane to a treatment for water containing fouling substances such as various surfactants, for example, sewage. In addition to the high performance of the reverse osmosis membrane (a high salt rejection and a high water permeability), a high fouling resistance is required to maintain the desired flux for a long period. The above reverse osmosis membranes and the conventional after treatment methods are not sufficient to satisfy these two requirements. Therefore, a reverse osmosis composite membrane having a higher performance has been sought.

One fouling mechanism includes the charge condition of the membrane. For example, the surface of a cross-linked polyamide reverse osmosis membrane obtained by interfacial polymerization of polyfunctional aromatic amine and polyfunctional alicyclic acid halide has a negative charge due to the residual carboxylic acid. The membrane surface having negative charge adsorbs, for example, cationic fouling substances, decreasing the flux. Therefore, a membrane has been required that is neutral in charge and has a high water permeability and a high salt rejection.

DISCLOSURE OF INVENTION

It is an object of the present invention to provide a reverse osmosis composite membrane that has a high salt rejection, a high water permeability, and a high fouling tolerance and permits practical desalination at a low pressure, and a reverse osmosis treatment method for water using the same.

In order to achieve the above object, the present invention provides a reverse osmosis composite membrane comprising a sponge layer and a separation layer formed on a surface of the sponge layer, wherein at least one substance selected from the group consisting of an electrically neutral organic substance and an electrically neutral polymer is present in the separation layer or a surface of the separation layer is coated with at least one substance selected from the group consisting of an electrically neutral organic substance and an electrically neutral polymer, and wherein a surface zeta ($\zeta$) potential of the layer in which the at least one substance is present or the coating layer is controlled within ±10 mV at pH 6. The surface zeta ($\zeta$) potential of such a membrane can be measured by using an electrophoretic light scattering device or the like. Also, the separation layer means a skin layer.

In the reverse osmosis composite membrane of the present invention, the surface zeta potential is within ±10 mV preferably in the range of pH 6 to 8, in which pH range the reverse osmosis composite membrane is used, and more preferably, in the range of pH 5 to 11.

In the reverse osmosis composite membrane, it is preferable that the reverse osmosis composite membrane comprising the sponge layer and the separation layer formed on the surface of the sponge layer is a reverse osmosis composite membrane in which the absolute value of the surface zeta ($\zeta$) potential is greater than ±10 mV in the range of pH 5 to 11. Electroneutrality is preferred for controlling the electrical adsorption of membrane-fouling substances having a charge group present in water by the membrane.

In the reverse osmosis composite membrane, it is preferable that the at least one substance selected from the group consisting of an electrically neutral organic substance and an electrically neutral polymer is an organic substance or a polymer that has a nonionic hydrophilic group (for example, a ——OH group). Because, in addition to the electroneutrality, adsorption due to a hydrophobic interaction on the membrane is controlled when the membrane-fouling substances have a hydrophobic group.

In the reverse osmosis composite membrane, it is preferable that the organic substance or the polymer that has a nonionic hydrophilic group is polyvinyl alcohol that is water-insoluble at 25° C. and is water-soluble at 80° C. Such polyvinyl alcohol controls the adsorption of the membrane-fouling substances. On the other hand, polyvinyl alcohol that is water-insoluble at a temperature of more than 80° C. has a small number of alcohol groups, so that such polyvinyl alcohol does not tend to control the adsorption of the membrane-fouling substances.

In the reverse osmosis composite membrane, it is preferable that the polyvinyl alcohol has a saponification degree of 95% or more, because a sufficient number of alcohol groups can be obtained.

In the reverse osmosis composite membrane, it is preferable that the thickness of the organic substance or the polymer that has a nonionic hydrophilic group coating the surface of the separation layer is in the range of 0.001 to 1 $\mu$m. If the thickness is more than 1 $\mu$m, the water permeability obtained after the coating decreases significantly. If the thickness is less than 0.001 $\mu$m, a uniform coating will be difficult.

In the reverse osmosis composite membrane, it is preferable that the reverse osmosis composite membrane in which an absolute value of the surface zeta ($\zeta$) potential before treatment is greater than±10 mV in the range of pH 5 to 11 has a flux of 0.6 [$m^3/m^2$/day] or more in a reverse osmosis test conducted by feeding a 500 ppm NaCl solution at a pressure of 7.5 kg/$cm^2$ and a temperature of 25° C. to ensure a sufficient flux after the coating.

In the reverse osmosis composite membrane, it is preferable that the reverse osmosis composite membrane has a flux of 0.6 [$m^3/m^2$/day] or more in a reverse osmosis test conducted by feeding a 1,500 ppm NaCl solution at a pressure of 15 kg/$cm^2$ and a temperature of 25° C. to ensure a sufficient flux at a practical level.

In the reverse osmosis composite membrane, it is preferable that the reverse osmosis composite membrane is formed of aromatic polyamide. Here, the aromatic polyamide refers to polyamide in which at least one component selected from the group consisting of an acid component and an amine component is aromatic. The preferred aromatic polyamide is a completely aromatic polyamide comprising an aromatic acid component and an aromatic amine component. Such aromatic polyamide can maintain a high water permeability and a high salt rejection.

The present invention provides a reverse osmosis treatment method for water comprising using any of the reverse osmosis composite membranes of the present invention.

In the reverse osmosis treatment method, it is preferable that water containing surfactant is fed to the reverse osmosis composite membrane as raw water. In the conventional reverse osmosis composite membranes, the membrane adsorbs a surfactant, so that a stable performance cannot be obtained. In the reverse osmosis composite membrane of the present invention, the adsorption of the surfactant by the membrane is controlled. Therefore, a stable reverse osmosis treatment can be conducted for water containing a surfactant without decreasing the separation performance.

In the reverse osmosis treatment method, it is preferable that the content of the surfactant is in the range of 0.01 ppm to 20 wt. %. In the method of the present invention, the content of the surfactant can be in any range. If the content is in the range of 0.01 ppm to 20 wt. %, a sufficient surface potential property of the present invention can be provided.

In the reverse osmosis treatment method, it is preferable that water containing a transition metal component is fed to the reverse osmosis composite membrane as raw water. In the conventional reverse osmosis composite membranes, the membrane adsorbs a transition metal component, so that a stable performance cannot be obtained. In the reverse osmosis composite membrane of the present invention, the adsorption of the transition metal component by the membrane is controlled. Therefore, a stable reverse osmosis treatment can be conducted for water containing a transition metal component without decreasing the separation performance.

In the reverse osmosis treatment method, it is preferable that the transition metal component is iron, because the reverse osmosis composite membrane of the present invention can control the adsorption of the iron component sufficiently.

In the reverse osmosis treatment method, it is preferable that the content of the transition metal component is in the range of 0.01 ppm to 20 wt. %. In the method of the present invention, the content of the transition metal component can be in any range. If the content of the transition metal component is in the range of 0.01 ppm to 20 wt. %, a sufficient surface potential property of the present invention can be provided.

According to the reverse osmosis composite membrane and the reverse osmosis treatment method using the same of the present invention as described above, a high salt rejection, a high water permeability, and a high fouling tolerance is provided, and practical desalination can be conducted at a low pressure

BEST MODE FOR CARRYING OUT THE INVENTION

Figure 1:
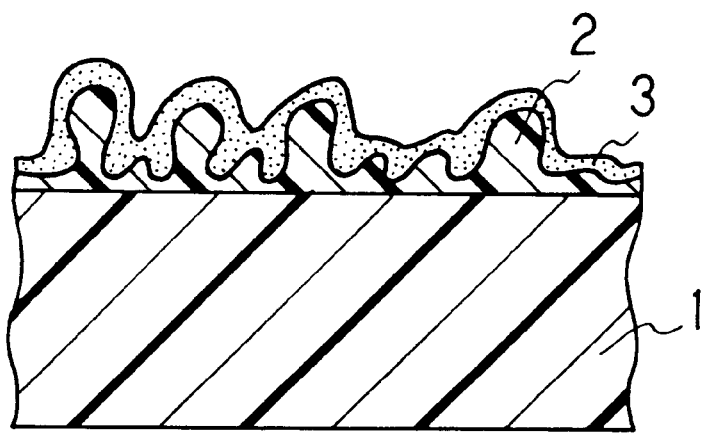
FIG. 1 is a schematic cross-sectional view of the surface portion of a reverse osmosis composite membrane in one embodiment of the present invention.

The method for controlling the surface $\zeta$ potential of the present invention is not particularly limited. The surface of the reverse osmosis composite membrane is preferably treated with at least one substance selected from the group consisting of an electrically neutral organic substance and an electrically neutral polymer, and more preferably, at least one substance selected from the group consisting of an organic substance and a polymer that has a nonionic hydrophilic group.

Such at least one substance selected from the group consisting of an electrically neutral organic substance and an electrically neutral polymer is an organic substance or a polymer that has a cationic group and an anionic group, which is prepared as a copolymer or a blend. Examples of a suitable nonionic hydrophilic group are expressed by the following Formulae 1 to 4:

HO—  Formula 1

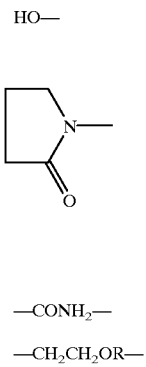

Formula 2

—CONH₂—  Formula 3

—CH₂CH₂OR—  Formula 4

(wherein R represents an alkyl group having 1 to 4 carbon atoms.)

This organic substance or polymer that has a nonionic hydrophilic group is selected from the group consisting of vinyl polymers, condensation polymerized compounds, and addition polymerized compounds each having a nonionic hydrophilic group, such as polyvinyl alcohol, a saponified polyethylene-vinyl acetate copolymer, polyvinyl pyrrolidone, hydroxypropyl cellulose, and polyethylene glycol. A more preferable polymer having a nonionic hydrophilic group is water-insoluble at 25° C. and is hot-water-soluble, for example, polyvinyl alcohol.

The saponification degree of polyvinyl alcohol is 95% or more, and more preferably in the range of 99 to 100%. In this case, the polyvinyl alcohol is water-insoluble at 25° C. due to hydrogen bonding between molecular chains but is water-soluble at 80° C. Satisfying these conditions is preferable because of the following reasons. Since many —OH groups are in contact with treated water on the surface of the membrane, the hydrophilicity increases. Thus, the tolerance to fouling substances increases and the decrease of the flux involved in the treatment is controlled. Therefore, the membrane can provide a very good performance.

A specific controlling method for charging the surface of the reverse osmosis composite membrane using the organic substance or the polymer will be described below.

The reverse osmosis composite membrane is not particularly limited. The examples of the reverse osmosis composite membranes are polyamide, polyurea and the like, manufactured by an interfacial polymerization method. These membranes can be readily obtained by conventionally known methods. For example, at least one surface of a porous polysulfone support film is coated with an aqueous solution of a monomer or a polymer that has a reactive amino group such as metaphenylenediamine, piperazine, or polyethyleneimine, and the coated surface is contacted with a solution in which a polyfunctional acid chloride such as trimesic acid chloride or isophthalic acid chloride, a polyfunctional isocyanate such as tolylenediisocyanate, or a mixture thereof is dissolved in a solvent such as hexane, to perform interfacial polymerization on the porous polysulfone support film to form a thin film having desalination properties. As a result, a reverse osmosis composite membrane can be made. In these reverse osmosis composite membranes, the absolute value of the surface ζ potential is greater than 10 mV in the range of pH 5 to 11 due to the effect of the residual functional groups.

The thus obtained reverse osmosis composite membrane is coated with a solution of the organic substance or the polymer and dried to obtain a final reverse osmosis composite membrane in which surface charge is controlled. This organic substance or polymer that has a nonionic hydrophilic group is dissolved in a solvent that is not likely to damage the active thin film layer of the reverse osmosis composite membrane, such as water, lower alcohol, hydrocarbon halide, aliphatic hydrocarbon, acetone, acetonitrile, or a mixture thereof. Among these solvents, aliphatic alcohols such as methanol, ethanol, propanol, and butanol; aliphatic alcohol halide such as ethylene chlorohydrin; methoxymethanol; methoxyethanol; and a mixed solvent of at least one of these lower alcohols and water are preferable. In the mixed solvent, the ratio of the lower alcohol to water is not particularly limited. The ratio of water is preferably 0 to 90%. When water is used as a solvent, a surfactant is preferably added to improve the wettability for the membrane.

The concentration of the organic substance or the polymer prepared by using the solvent is preferably in the range of 0.01 to 20 wt. %, and more preferably, 0.05 to 5 wt. %. The coating method is not particularly limited. A dipping method, a transfer method, a spraying method, or the like is preferably used. The drying means and the drying temperature after the coating are not particularly limited. The drying temperature is preferably in the range of 20 to 200° C., and more preferably, 50 to 150° C.

The thickness of the thus obtained thin film on the reverse osmosis composite membrane is preferably in the range of 0.001 to 1 μm, and more preferably, 0.005 to 0.5 μm to control the decrease of the flux caused by the coating. The method for controlling the thickness is not particularly limited. The thickness can be controlled by the concentration of the solution, or the like.

As a method for controlling the surface of the reverse osmosis membrane, the surface charge can be controlled by mixing the organic substance or the polymer with an aqueous solution of the monomer or the polymer that has a reactive amino group or a solution of acid chloride or isocyanate dissolved in a solvent such as hexane, and manufacturing a reverse osmosis composite membrane according to the above procedure.

In this case, the lower alcohol is preferably added to at least one of the solutions, to which the polymer is added, to provide the solubility of the polymer.

The performance of the reverse osmosis composite membrane is not particularly limited. The flux is preferably 0.6 [m³/m²/day] or more in a reverse osmosis test conducted by feeding a 500 ppm NaCl solution at a pressure of 7.5 kg/cm² and a temperature of 25° C. to maintain a high water permeability of the reverse osmosis composite membrane after the treatment with the organic substance or the polymer. The water permeability of the reverse osmosis composite membrane obtained after the treatment with the organic substance or the polymer is not particularly limited. In view of its practical use, the flux is preferably 0.6 [m³/m²/day] or more in a reverse osmosis test conducted by feeding a 1,500 ppm NaCl solution at a pressure of 15 kg/cm² and a temperature of 25° C.

Furthermore, the flux of the reverse osmosis composite membrane having a water-insoluble polymer having a nonionic hydrophilic group as a surface layer or in the separation layer is preferably 0.1 [m³/m²/day] or more, and more preferably, 0.6 [m³/m²/day] or more in view of practical operation when evaluated by feeding a 1,500 ppm NaCl solution at a pressure of 15 kg/cm² and a temperature of 25° C.

Figure 2:
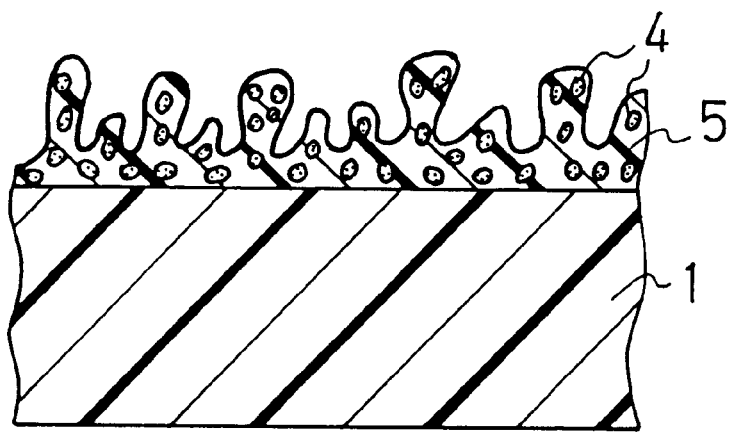
FIG. 2 is a schematic cross-sectional view of the surface portion of a reverse osmosis composite membrane in another embodiment of the present invention.

Next, the embodiments of the present invention will be described below with reference to the drawings. FIGS. 1–2 are schematic cross-sectional views of the embodiments of the present invention. In FIG. 1, a separation layer 2 is present on a porous layer 1. A thin film 3 of polyvinyl alcohol is present as the surface layer of the separation layer 2. FIG. 2 shows a layer (portion) in which a polyvinyl alcohol component 4 and a separation layer 5 are present in a phase separation condition on the porous layer 1. The polyvinyl alcohol component need not be in the shape of a thin film. In the present invention, the conditions of FIGS. 1 and 2 may be combined.

The present invention will be described below with reference to the examples. However, the present invention is not limited to these examples.

EXAMPLE 1

An aqueous solution in which 3.0 wt. % of triethylamine, 6.0 wt. % of camphor sulfonic acid, and 5.0 wt. % of isopropyl alcohol were added to an aqueous solution containing 3.0 wt. % of m-phenylenediamine and 0.15 wt. % of sodium lauryl sulfate was contacted with a microporous polysulfone support film for several seconds, and the excess solution was removed to form a layer of the solution on the support film.

Next, the surface of such a support film was contacted with an IP1016 (isoparaffin hydrocarbon oil manufactured by Idemitsu Petrochemical Corporation) solution containing 0.20 wt. % of trimesic acid chloride and 0.05 wt. % of isopropyl alcohol, and was then held in a hot air dryer at 120° C. for 3 minutes. Consequently, a skin layer was formed on the support. Thus, a reverse osmosis composite membrane was obtained.

Then, polyvinyl alcohol having a saponification degree of 99% (the average polymerization degree n=2,000) was dissolved in a solution containing isopropyl alcohol and water in the ratio of 3:7 to prepare an aqueous solution of 25 wt. % of polyvinyl alcohol (PVA). The reverse osmosis composite membrane was coated with this solution and dried at 130° C. for 5 minutes. As a result, a PVA coating film having an average thickness of about 0.1 $\mu$m was obtained.

The performance of the reverse osmosis composite membrane having the PVA coating film was evaluated by using an aqueous solution containing 1,500 ppm of sodium chloride at a pressure of 15 kgf/cm$^2$ and is shown in Table 1.

TABLE 1

| Sample | NaCl (at 25° C.) rejection [%] | Flux (at 25° C.) [m$^3$/m$^2$/day] | Ratio of flux after treatment to flux before treatment |
|---|---|---|---|
| Example 1 | 99.70 | 1.2 | 0.7 |
| Before polyvinyl alcohol treatment | 99.48 | 1.7 | — |
| Evaluation with an aqueous solution containing 500 ppm sodium chloride at a pressure of 7.5 kgf/cm$^2$ | 99.56 | 0.8 | |

After washing the obtained reverse osmosis composite membrane sufficiently, the electrical mobility of the surface of the membrane was measured by using an electrophoretic light scattering device (ELS-800 manufactured by Otsuka Electronics Co., Ltd.). A surface zeta ($\zeta$) potential was calculated from the electrical mobility according to the following Equation 1 (Smoluchowski's equation).

$$U = \epsilon \zeta / 4\pi\eta \qquad \text{Equation 1}$$

wherein U is the electrical mobility, $\epsilon$ is the permittivity of the solution, and $\eta$ is the viscosity of the solution.

(More specifically, the reverse osmosis composite membrane was cut to a size of about 30×60 mm, and set in a cell for a flat sheet sample attached to the measurement device. The standard particle for electrophoresis was a polystyrene particle (520 nm) whose surface was coated with hydroxypropyl cellulose. A 10 mM NaCl solution in which the polystyrene particles were dispersed was used. For measuring the pH dependency of the surface zeta ($\zeta$) potential, this solution was adjusted to the pH for the measurement by using an aqueous solution of HCl or NaOH.)

Figure 3:
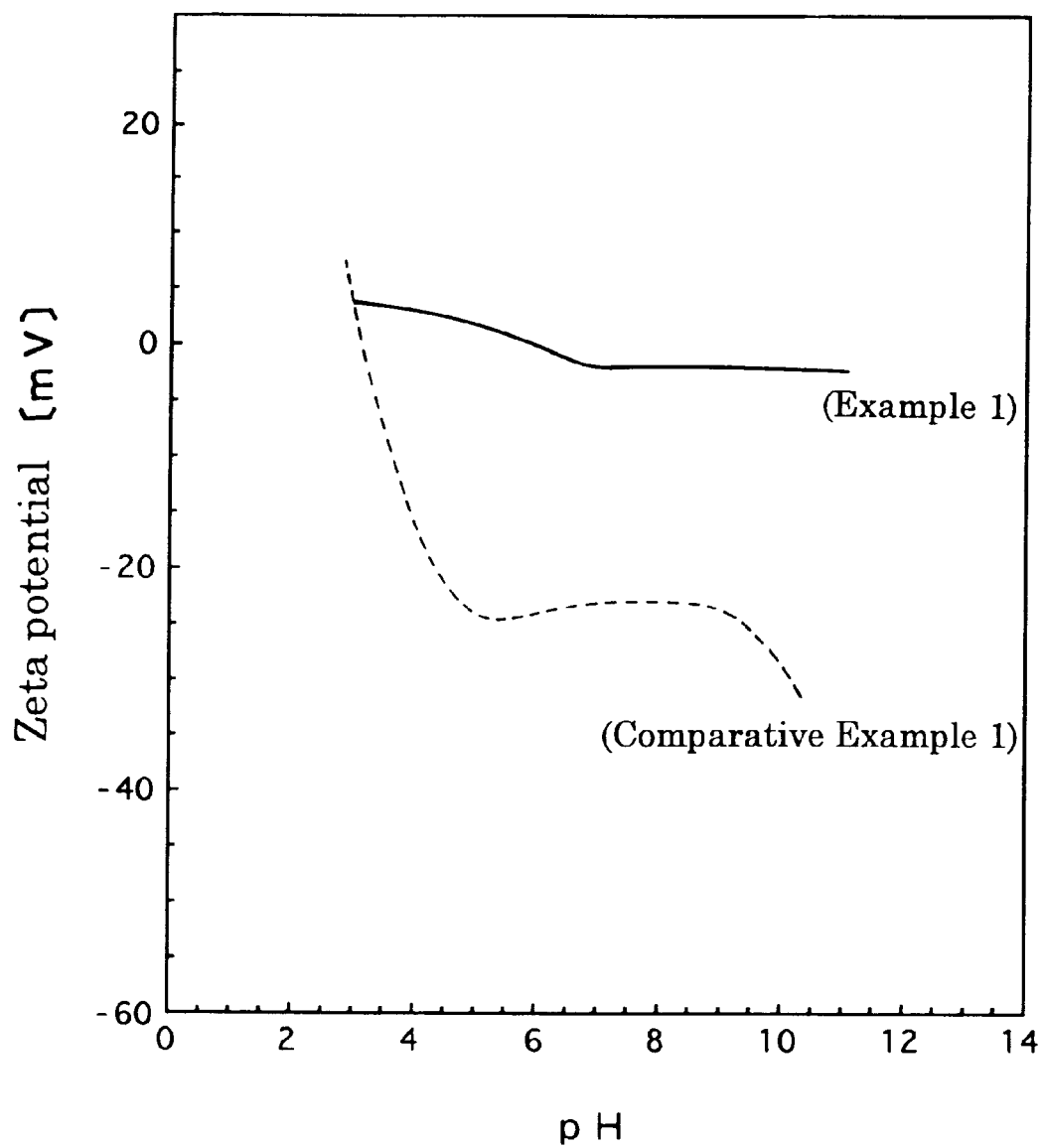
FIG. 3 is a graph showing the result of the pH dependency of the surface zeta ($\zeta$) potential of reverse osmosis composite membranes in Example 1 according to the present invention and Comparative Example 1.

FIG. 3 shows the result of the pH dependency of the surface zeta ($\zeta$) potential.

For evaluation of fouling tolerance, the membrane was set in a flat membrane cell, and the flux of pure water (evaluated at a pressure of 15 kgf/cm$^2$) was evaluated before and after an aqueous solution containing 1,000 ppm of a cationic surfactant was pressure circulated at a pressure of 15 kgf/cm$^2$ for 17 hours. The results are shown in Table 2.

COMPARATIVE EXAMPLE 1

The same measurements as in Example 1 were made by using a reverse osmosis composite membrane before surface coating with polyvinyl alcohol. The results are shown in Table 2.

TABLE 2

| Sample | Surface zeta $\zeta$ potential at pH 6 [mV] | Flux-1[1] [m$^3$/m$^2$/day] | Flux-2[2] [m$^3$/m$^2$/day] | Retention[3] [%] |
|---|---|---|---|---|
| Example 1 | 0 | 1.2 | 1.0 | 83 |
| Comparative Example 1 | −25 | 2.0 | 0.9 | 45 |

Note [1]Flux-1: the flux of pure water evaluated before pressure circulation of the cationic surfactant
Note [2]Flux-2: the flux of pure water evaluated after pressure circulation of the cationic surfactant
Note [3]Retention: (Flux-2/Flux-1) × 100

FIG. 3 shows the result of the pH dependency of the surface zeta ($\zeta$) potential of the reverse osmosis composite membranes in Example 1 according to the present invention and Comparative Example 1.

As described above, according to the example of the present invention, the isoelectric point of the surface of the separation layer was changed to a neutral range by forming the PVA thin layer having a saponification degree of 99%, and therefore the fouling tolerance was improved. Also, the reverse osmosis composite membrane had a high salt rejection and a high water permeability and permitted practical desalination at a relatively low pressure.

On the other hand, the Z-potential of the reverse osmosis membrane without PVA coating (Comparative Example 1) was negative.

EXAMPLE 2

After manufacturing a reverse osmosis composite membrane by interfacial polycondensation in the same manner as in Example 1, polyvinyl alcohol (PVA) having a saponification degree of 99% was dissolved in a 1:1 solution containing isopropyl alcohol (IPA) and water at a concentration of 0.25 wt. %. The reverse osmosis composite membrane was coated with this PVA solution by dipping and dried at 130° C. for 5 minutes to form a thin layer having an average thickness of about 0.1 $\mu$m. The membrane was evaluated by feeding a 1,500 ppm NaCl solution at a pressure of 15 kg/cm$^2$ and a temperature of 25° C. Then, a permeation test of industrial water (28 hours) was performed by using the membrane at a pressure of 15 kg/cm$^2$ and a temperature of 25° C., and the change in flux due to fouling was measured. Furthermore, the surface of the membrane was washed with oxalic acid (pH=2, 1 hour). A change in the flux of ultrapure water before and after the permeation test of the industrial water was measured, and the washing recovery was measured. The results of Example 2 and Comparative Example 2 are shown in Table 3. The PVA layer on the surface of the membrane of Example 2 was present after the test without being dissolved in water.

As is apparent from the results in Table 3, it was confirmed that the composite reverse osmosis membrane of Example 2 to which the PVA solution was applied maintained a high salt rejection and a high water permeability, had a high fouling tolerance, and permitted practical desalination at a relatively low pressure.

COMPARATIVE EXAMPLE 2

The reverse osmosis composite membrane without the PVA layer in Example 1 was measured. The results are shown in Table 3.

TABLE 3

| Sample | Initial Performance | | | Permeation of industrial water in Ibaraki City | | After washing with oxalic acid | |
|---|---|---|---|---|---|---|---|
| | NaCl 1500 ppm Rej. (%) | Flux m$^3$/m$^2$/d | Ultrapure water Flux 1 m$^3$/m$^2$/d | Flux after 28 hr m$^3$/m$^2$/d | Retention Flux/ Flux 2 | Ultrapure water Flux m$^3$/m$^2$/d | Washing recovery ratio Flux/ Flux 1 |
| Example 2 | 99.70 | 1.02 | 1.01 | 0.78 | 77.2% | 0.91 | 89.5% |
| Comparative Example 2 | 99.48 | 2.01 | 1.82 | 0.98 | 53.8% | 1.23 | 67.8% |

COMPARATIVE EXAMPLE 3

Polyvinyl alcohol (water-soluble PVA) having a saponification degree of 89% was evaluated in the same manner as in Example 1. As a result, the PVA on the surface was not present because it was dissolved in water.

EXAMPLE 3

After manufacturing a reverse osmosis composite membrane by interfacial polycondensation in the same manner as in Example 1, polyvinyl alcohol (PVA) having a saponification degree of 99% was dissolved in a solution of isopropyl alcohol (IPA) and water (IPA:H$_2$O=3:7). The surface of the composite reverse osmosis membrane obtained by the above-described method was coated with a 0.13 wt % PVA solution by dipping, and dried at 130° C. for 5 minutes to form a thin layer. Furthermore, in order to avoid the some portions being left uncoated, the membrane was again coated, by dipping, with a solution in which 0.1 wt % of polyvinyl alcohol (PVA) was dissolved in a solution of isopropyl alcohol (IPA) and water (IPA:H$_2$O=3:7), and dried at 130° C. for 5 minutes. As a result, a reverse osmosis membrane was obtained. The surface zeta (ζ) potential of the reverse osmosis membrane was the same as that shown in FIG. 3.

For evaluation of fouling tolerance, a decrease in flux due to adsorption was measured by using a cationic surfactant. For the measurement, the membrane was set in a flat membrane cell, and an aqueous solution containing 500 ppm of catiogen PAN (manufactured by DAI-ICHI KOGYO SEIYAKU Co., Ltd.) was used as water containing a cationic surfactant. The aqueous solution was pressure circulated at a pressure of 15 kgf/cm$^2$ for 1 hour, and the flux was measured. The flux was compared with that measured before adding the cationic surfactant. The results are shown in Table 4.

COMPARATIVE EXAMPLE 4

The membrane before the PVA layer was formed as described in Example 3, that is, a membrane without PVA coating, was measured. The results are shown in Table 4.

TABLE 4

| Sample | Isoelectric point | Initial Flux [m$^3$/m$^2$/day] | Flux (1 hr) after a cationic surfactant is added [m$^3$/m$^2$/day] | Retention [%] |
|---|---|---|---|---|
| Example 3 | pH 6.4 | 1.43 | 0.84 | 58.9 |
| Comparative Example 4 | pH 3.4 | 1.89 | 0.61 | 32.2 |

As described above, according to the present invention, the isoelectric point of the surface of the separation layer was changed to a neutral range by forming the PVA thin layer, and therefore the fouling tolerance was improved. Also, the reverse osmosis composite membrane had a high salt rejection and a high water permeability and permitted practical desalination at a relatively low pressure.

EXAMPLE 4

An aqueous solution in which 3.0 wt. % of triethylamine, 6.0 wt. % of camphor sulfonic acid, and 5.0 wt. % of isopropyl alcohol were added to an aqueous solution containing 3.0 wt. % of m-phenylenediamine and 0.15 wt. % of sodium lauryl sulfate was contacted with a microporous polysulfone support film for several seconds, and the excess solution was removed to form a layer of the solution on the support film Next, the surface of such a support film was contacted with an IP1016 (isoparaffin hydrocarbon oil manufactured by Idemitsu Petrochemical Corporation) solution containing 0.20 wt. % of trimesic acid chloride and 0.05 wt. % of isopropyl alcohol, and was then held in a hot air dryer at 120° C. for 3 minutes. Consequently, a skin layer was formed on the support. Thus, a reverse osmosis composite membrane was obtained.

Then, polyvinyl alcohol having a saponification degree of 99% (n=2,000) was dissolved in a solution containing isopropyl alcohol and water in the ratio of 3:7 to prepare an aqueous solution of 25 wt. % of polyvinyl alcohol. The reverse osmosis composite membrane was coated with this solution and dried at 130° C. for 5 minutes. As a result, the reverse osmosis composite membrane of the present invention was obtained. The performance of the membrane was evaluated by using an aqueous solution containing 1,500 ppm of sodium chloride at a pressure of 15 kg/cm$^2$ and is shown in Table 5.

TABLE 5

| Sample | NaCl (at 25° C.) rejection [%] | Flux (at 25° C.) [m$^3$/m$^2$/day] | Ratio of flux after treatment to flux before treatment |
|---|---|---|---|
| Example 4 | 99.70 | 1.2 | 0.7 |
| Before polyvinyl alcohol treatment | 99.48 | 1.7 | — |
| Evaluation with an aqueous solution containing 500 ppm sodium chloride at a pressure of 7.5 kgf/cm$^2$ | 99.56 | 0.8 | |

After washing the obtained reverse osmosis composite membrane sufficiently, the electrical mobility of the surface of the membrane was measured by using the electrophoretic light scattering device (ELS-800 manufactured by Otsuka Electronics Co., Ltd.). A surface zeta ζ potential was calculated from the electrical mobility in the same manner as described above. The result is shown in Table 6.

For evaluation of tolerance to water containing a surfactant, the membrane was set in a flat membrane cell, and water obtained by filtering general domestic waste water containing 1 ppm of a surfactant with a water MF filter was pressure circulated at a pressure of 15 kgf/cm$^2$ for 14 days. The results are shown in Table 6.

COMPARATIVE EXAMPLE 5

A reverse osmosis composite membrane having the same reverse osmosis membrane performance as the membrane whose surface was treated with polyvinyl alcohol was used. An aqueous solution in which 3.0 wt. % of triethylamine and 6.0 wt. %, of camphor sulfonic acid were added to an aqueous solution containing 2.0 wt. % of m-phenylenediamine and 0.15 wt. % of sodium lauryl sulfate was contacted with a microporous polysulfone support film for several seconds, and the excess solution was removed to form a layer of the solution on the support film.

Next, the surface of such a support film was contacted with a hexane solution containing 0.20 wt. % of trimesic acid chloride and 0.30 wt. % of isophthalic acid chloride, and was then held in a hot air dryer at 120° C. for 3 minutes. Consequently, a skin layer was formed on the support. Thus, a reverse osmosis composite membrane was obtained.

The same resistance test as in Example 4 was made on the reverse osmosis composite membrane. The results are shown in Table 6.

TABLE 6

| Sample | Surface ζ potential at [mV] | Flux-1*[1] [m$^3$/m$^2$/day] | Flux-2*[2] [m$^3$/m$^2$/day] | Retention*[3] [%] |
|---|---|---|---|---|
| Example 4 | 0 | 1.2 | 1.1 | 92 |
| Comparative Example 5 | −17 | 1.2 | 0.6 | 50 |

Note *[1]Flux-1: the flux at the start of pressure circulation
Note *[2]Flux-2: the flux of water after 14 days of pressure circulation
Note *[3]Retention: (Flux-2/Flux-1) × 100

EXAMPLE 5

A reverse osmosis composite membrane was formed in the same manner as in Example 4, and the surface of the membrane was coated with polyvinyl alcohol. The value of the surface zeta (ζ) potential is shown in Table 7.

Figure 4:
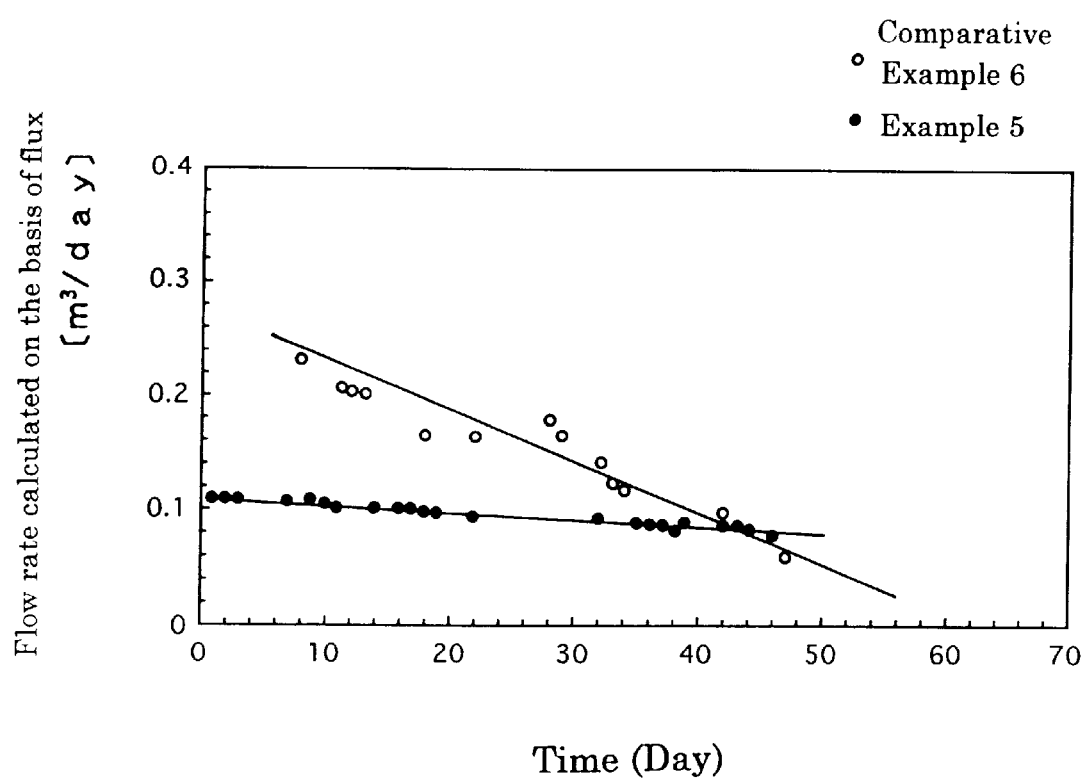
FIG. 4 is a graph showing the resistance of reverse osmosis composite membranes in Example 5 according to the present invention and Comparative Example 6 with respect to water containing an iron component.

The tolerance to water containing an iron component was evaluated by setting a 4-inch element manufactured by using this membrane, and performing an operation at a constant flow rate of 1.4 (l/mm) by using industrial water containing 0.90 mg/l of an iron component. The results are shown in FIG. 4.

COMPARATIVE EXAMPLE 6

For comparison, a reverse osmosis composite membrane before surface treatment with polyvinyl alcohol was measured in the same manner as in Example 5. The results are shown in Table 7 and FIG. 4.

TABLE 7

| Sample | surface zeta (ζ) potential at pH6 [mV] |
|---|---|
| Example 5 | 0 |
| Comparative Example 6 | −25 |

After the evaluation, the elements of Example 5 and Comparative Example 6 were disassembled. No iron component attached to the surface of the membrane of the element of Example 5 was seen, while the iron component was attached to the surface of the membrane of the element of Comparative Example 6.

It was also indicated that Example 5 could ensure a sufficient flux in an operation at a low pressure and operate stably for a long time.

As described above, the reverse osmosis composite membrane of the present invention had a high salt rejection, a high water permeability, and a high fouling tolerance, and permitted practical desalination at a relatively low pressure. Furthermore, the performance of the reverse osmosis composite membrane did not deteriorate significantly even by conducting a reverse osmosis treatment with raw water containing a surfactant or a transition metal component.

What is claimed is:

1. A reverse osmosis composite membrane comprising:
    a sponge layer; and
    a separation layer formed on a surface of the sponge layer, wherein said separation layer comprises an aromatic polyamide, wherein a surface of the separation layer has a coating layer of at least one substance selected from the group consisting of an electrically neutral organic substance and an electrically neutral polymer, wherein a surface zeta (ζ) potential of the coating layer is controlled within±10 mV at pH 6, wherein the reverse osmosis composite membrane has a flux of 0.6 m³/m²/day or more in a reverse osmosis test conducted by feeding a 1,500 ppm NaCl solution at a pressure of 15 kg/cm² and a temperature of 25° C., and wherein the reverse osmosis composite membrane before coating has an absolute value of the surface zeta (ζ) potential greater than±10 mV in the range of pH 5 to 11 and has a flux of 0.6 m³/m²/day or more in a reverse osmosis test conducted by feeding a 500 ppm NaCl solution at a pressure of 7.5 kg/cm² and a temperature of 25° C.

2. The reverse osmosis composite membrane according to claim 1, wherein the at least one substance selected from the group consisting of an electrically neutral organic substance and an electrically neutral polymer is an organic substance or a polymer that has a nonionic hydrophilic group.

3. The reverse osmosis composite membrane according to claim 2, wherein the organic substance or the polymer that has a nonionic hydrophilic group is polyvinyl alcohol that is water-insoluble at 25° C. and is water-soluble at 80° C.

4. The reverse osmosis composite membrane according to claim 3, wherein the polyvinyl alcohol has a saponification degree of 95% or more.

5. The reverse osmosis composite membrane according to claim 2, wherein a thickness of the organic substance or the polymer that has a nonionic hydrophilic group coating the surface of the separation layer is in the range of 0.001 to 1 μm.

6. The reverse osmosis composite membrane according to claim 1, wherein the pH is in the range of 6 to 8.

7. The reverse osmosis composite membrane according to claim 1, wherein the pH is in the range of 5 to 11.

8. The reverse osmosis composite membrane according to claim 1, wherein said separation layer further comprises at least one substance selected from the group consisting of an electrically neutral organic substance and an electrically neutral polymer.

9. A reverse osmosis treatment method for water comprising using a reverse osmosis composite membrane comprising a sponge layer and a separation layer formed on a surface of the sponge layer, wherein said separation layer comprises an aromatic polyamide, wherein a surface of the separation layer has a coating layer of at least one substance selected from the group consisting of an electrically neutral organic substance and an electrically neutral polymer, wherein a surface zeta (ζ) potential of the coating layer is controlled within±10 mV at pH 6, wherein the reverse osmosis composite membrane has a flux of 0.6 m³/m²/day or more in a reverse osmosis test conducted by feeding a 1,500 ppm NaCl solution at a pressure of 15 kg/cm² and a temperature of 25° C., and wherein the reverse osmosis composite membrane before coating has an absolute value of the surface zeta (ζ) potential greater than±10 mV in the range of pH 5 to 11 and has a flux of 0.6 m³/m²/day or more in a reverse osmosis test conducted by feeding a 500 ppm NaCl solution at a pressure of 7.5 kg/cm² and a temperature of 25° C.

10. The reverse osmosis treatment method according to claim 9, wherein water containing a transition metal component is fed to the reverse osmosis composite membrane as raw water.

11. The reverse osmosis treatment method according to claim 10, wherein the transition metal component is iron.

12. The reverse osmosis treatment method according to claim 10, wherein a content of the transition metal component is in the range of 0.01 ppm to 20 wt. %.

13. The reverse osmosis treatment method according to claim 9, wherein water containing a surfactant is fed to the reverse osmosis composite membrane as raw water.

14. The reverse osmosis treatment method according to claim 13, wherein a content of the surfactant is in the range of 0.01 ppm to 20 wt. %.

15. The reverse osmosis treatment method according to claim 9, wherein said separation layer further comprises at least one substance selected from the group consisting of an electrically neutral organic substance and an electrically neutral polymer.

* * * * *